United States Patent [19]

Drouet et al.

[11] 4,222,707
[45] Sep. 16, 1980

[54] DEVICE FOR THE IMPACT COOLING OF THE TURBINE PACKING RINGS OF A TURBOJET ENGINE

[75] Inventors: Jacques L. Drouet, Dammarie les Lys; Marcel J. Tournére, Paris, both of France

[73] Assignee: Societe Nationale d'Etude et de Construction de Moteurs d'Aviation, Paris, France

[21] Appl. No.: 5,076

[22] Filed: Jan. 22, 1979

[30] Foreign Application Priority Data

Jan. 31, 1978 [FR] France .................. 78 02610

[51] Int. Cl.³ .................................. F02C 7/12
[52] U.S. Cl. ........................... 415/116; 415/178
[58] Field of Search .............. 415/115, 116, 117, 178

[56] References Cited

U.S. PATENT DOCUMENTS

| 3,825,364 | 7/1974 | Halila et al. | 415/174 |
| 4,013,376 | 3/1977 | Bisson et al. | 415/117 |
| 4,017,207 | 4/1977 | Bell et al. | 415/117 |

FOREIGN PATENT DOCUMENTS 867183 12/1952 Fed. Rep. of Germany ........... 415/116

Primary Examiner—Louis J. Casaregola
Attorney, Agent, or Firm—Bacon & Thomas

[57] ABSTRACT

The invention concerns an impact cooling device for the packing rings of the turbine of a turbojet engine. The flow of cooling air entering an enclosure concentric to the rings, is divided into two distinct ventilation circuits by means of a ferrule of a generally circular shape, having corrugations, and with the amplitudes of said corrugations decreasing from upstream to downstream.

13 Claims, 14 Drawing Figures

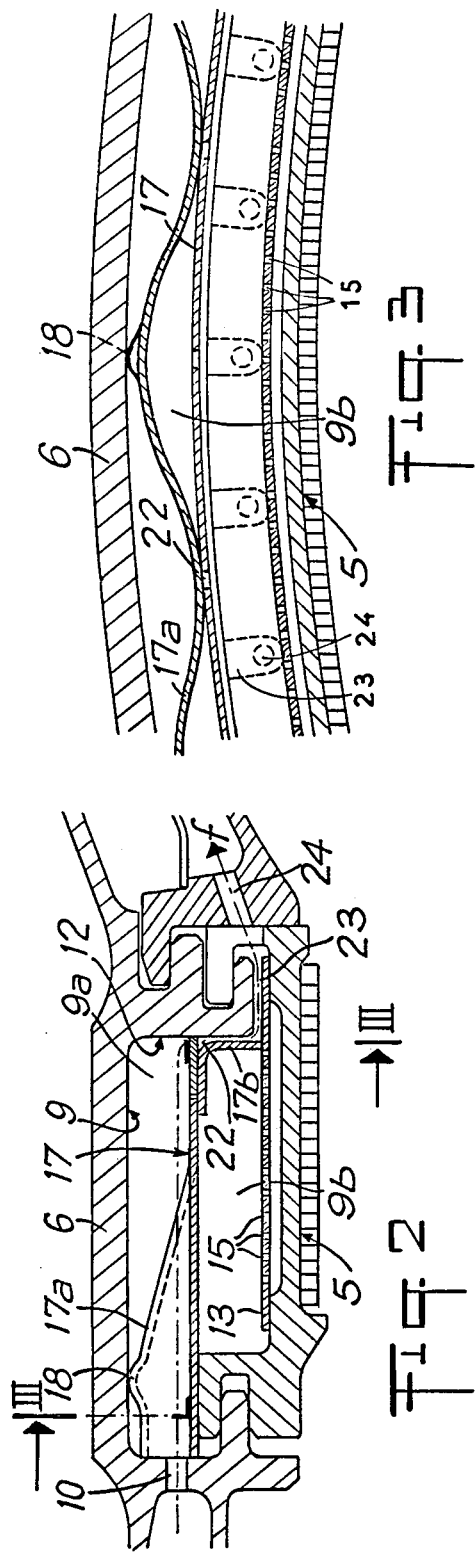
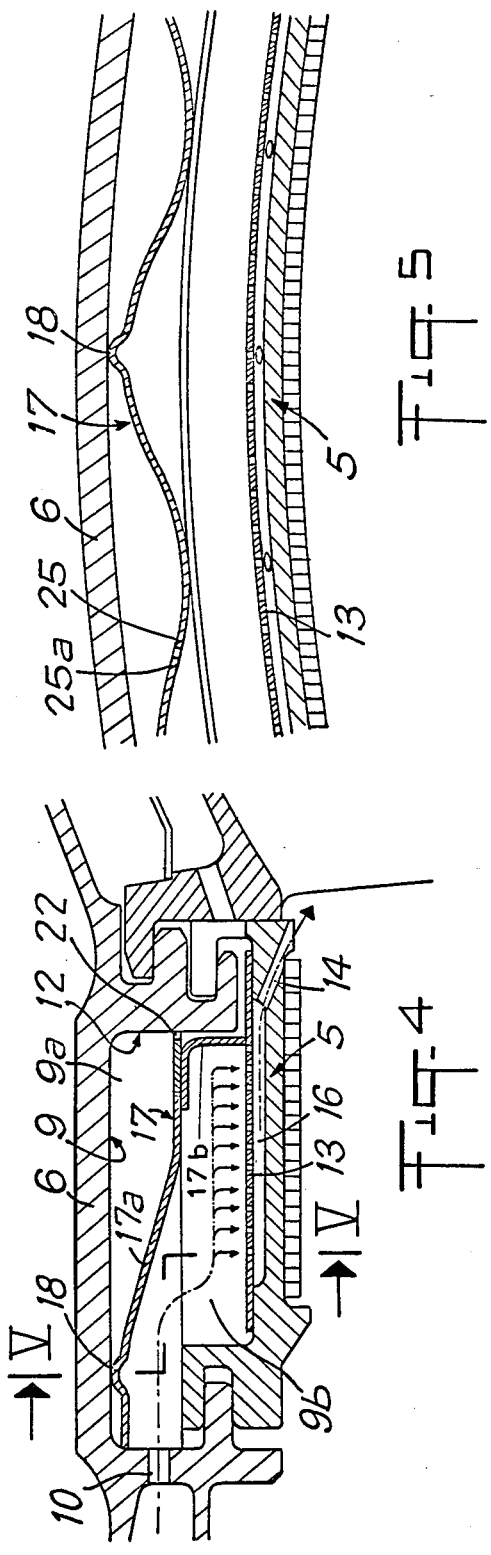

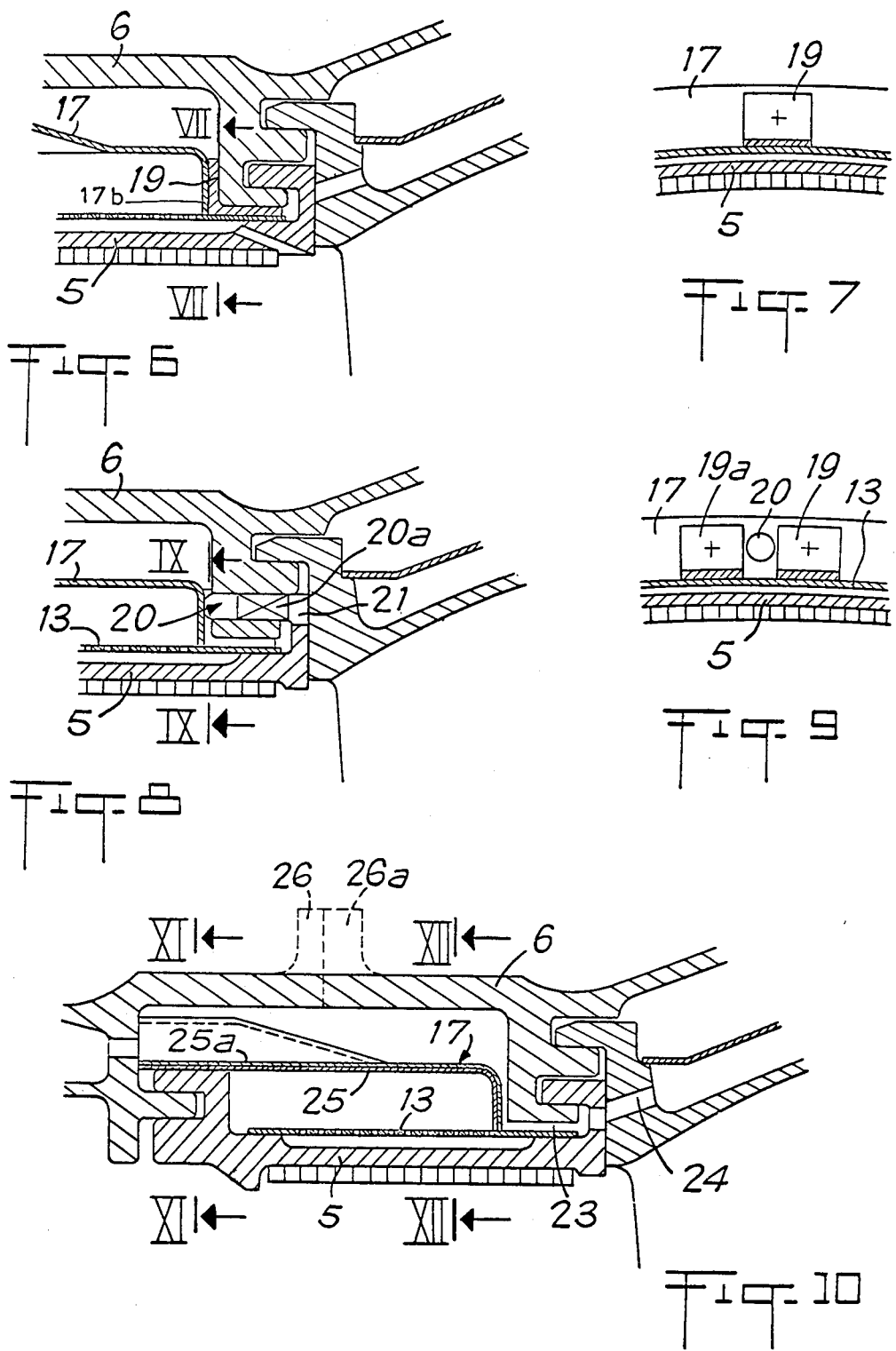

DEVICE FOR THE IMPACT COOLING OF THE TURBINE PACKING RINGS OF A TURBOJET ENGINE

BACKGROUND OF THE INVENTION

The object of the present invention is a device for the impact cooling of the turbine packing rings of a turbojet engine.

In known devices, the packing rings of a turbine are cooled by means of the relatively cold air issuing from an upstream stage of the compressor or taken from the cooling air of the combustion chamber. This air flows, for example, into an enclosure concentric with respect to the packing rings through regularly distributed orifices drilled into a radial flange of the turbine housing. At the outlet of the orifices, part of this air impacts the walls of the turbine housing, another part escapes through the clearance between the turbine housing and a low pressure distributor and finally, a third part passes through perforated plates separate from the surface of the rings for the impact cooling of the rings prior to returning to the stream of the driving fluid. However, the turbulence prevailing in the enclosure concentric with the packing rings acts to perturb the flow of air intended to cool the packing rings, thus interfering with the supply of air to the holes into the perforated plates.

SUMMARY OF THE INVENTION

According to the present invention, a ferrule of a generally circular shape is placed in the enclosure concentric with the packing rings, separating the enclosure into two chambers, with the chamber defined by the ferrule and the turbine housing being supplied with cooling air from some of the orifices, and the other chamber, defined by the ferrule and the perforated plates, is supplied with cooling air from other of the orifices.

According to another characteristic of the invention, the circular ferrule exhibits in its upstream part a crimped shape with corrugations having their pitch chosen so that a portion of the corrugations circumscribes the orifices for the admission of cooling air in communication with the chamber defined by the ferrule and the housing and another portion of the corrugations circumscribes the orifices in communication with the chamber defined by the ferrule and perforated plates.

The presence of the crimped ferrule in the enclosure concentric with the packing rings results in a reduction of turbulence and thus ensures an improved supply of cooling air to the impact holes drilled into the plates, while preserving the beneficial effect of cooling due to the impact of air on the bottom of the enclosure arranged in the housing.

BRIEF DESCRIPTION OF THE DRAWINGS

Other characteristics and advantages of the invention will be better understood when reading the description of several examples of embodiment presented hereinafter and by referring to the drawings attached hereto, wherein:

FIG. 2 is a view in axial section of an embodiment of the packing ring cooling device improved according to the invention, with the plane of the section passing through the bottom of a corrugation of the separating ferrule of a generally circular form;

FIG. 3 is a sectional view taken on the line III—III of FIG. 2;

FIG. 4 is a view in axial section of the embodiment of FIG. 2, with the plane of the section passing through the apex of a corrugation of the separating ferrule;

FIG. 5 is a sectional view taken on the line V—V of FIG. 4;

FIG. 6 is a view in axial section showing the manner of securing the downstream end of the ferrule;

FIG. 7 is a sectional view taken on the line VII—VII of FIG. 6;

FIG. 8 is a view in axial section of another manner of securing and centering the ferrule;

FIG. 9 is a sectional view taken on the line IX—IX of FIG. 8;

FIG. 10 is a view in axial section of the segment of the turbine showing the cover of the two ends of the separating ferrule, the ferrule being in the form of a discontinuous ferrule;

DESCRIPTION OF THE PREFERRED EMBODIMENTS

Figure 1:
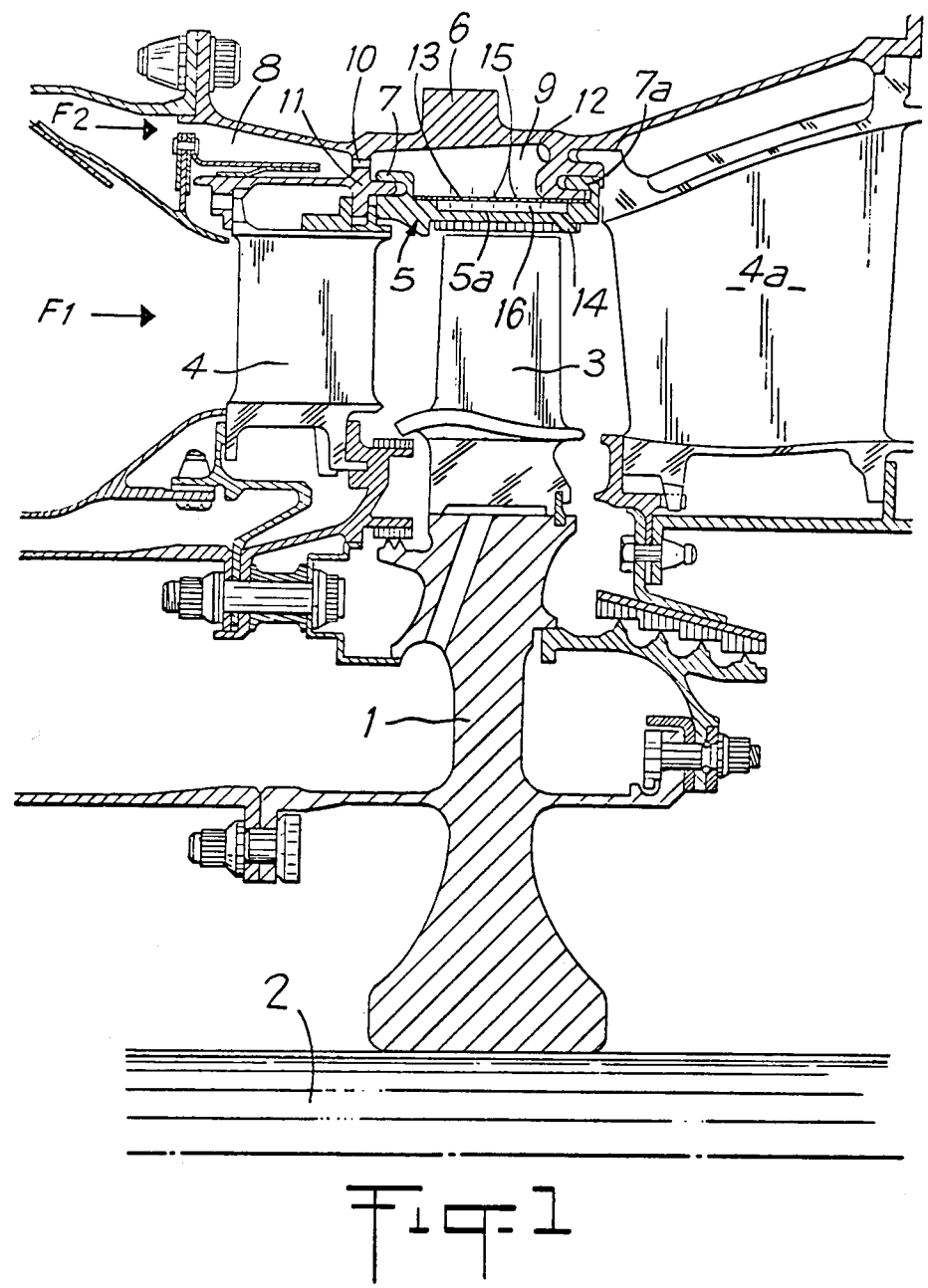
FIG. 1 is a view in axial section of a turbine having packing rings cooled by impact in accordance with the prior art.

In FIG. 1, the turbine of a turbojet engine is shown, said turbine comprising a rotor 1 coupled with a compressor means of a shaft 2 and carrying turbine blades 3 rotationally driven by the action of a flow of hot gas or driving fluid, directed toward the blades 3 by means of a series of stationary guide vanes 4, the shaft 2 of the figure connecting a stage of the turbine located farther downstream to a low pressure compressor.

Near the end of the blades 3, the packing rings 5 of the turbine are placed in a circular manner, said rings being mounted on the housing 6 of the turbine by means of flanges 7, 7a. The rings 5 are cooled by relatively cool air issuing from an upstream stage of the compressor or taken from the cooling air of the combustion chamber moving in the direction of the arrow F2 in an annular passage 8 defined by the housing 6. This air penetrates into the enclosure 9 within the housing 6 outwardly of the rings 5 through the orifices 10 uniformly distributed and drilled through a radial flange 11 of the housing 6 of the turbine. At the outlet of the orifices 10, a portion of the air strikes the bottom walls of the enclosure 9 in housing 6, another portion escapes through the clearance between the housing 6 of the turbine and the distributor formed by the blades 4, and finally, a last portion passes through the perforated plates 13 to cool the rings 5 by impact, prior to flowing back into the jet of moving fluid by way of the passages 14.

The plates 13 have a large number of small orifices and are separated from the external surface 5a of the rings by means of a space 16 which is connected to the jet of moving fluid by the passages 14.

According to the invention and as shown in FIGS. 2, 3, 4 and 5, a ferrule 17 is placed in the enclosure 9, said ferrule being of a generally circular shape and separating said enclosure into two chambers, one of them, 9a, being defined by the ferrule 17 and the turbine housing 6 and supplied with cooling air by some of the orifices 10, and the other, 9b, being defined by the ferrule 17 and the perforated plates 13 and supplied by the other of the orifices 10. The distribution of the orifices 10 between the chambers 9a, 9b is obtained by giving the ferrule 17 a crimped configuration 17a at its upstream portion, with the pitch of the corrugations being chosen so as to place one-half of the orifices 10 (FIGS. 2, 4, 11 and 12) in communication with the chamber 9a defined by the ferrule 17 and the turbine housing, and the other half of the orifices 10 in communication with the chamber 9b, defined by the ferrule 17 and the perforated plates. The distribution of cooling air between the chambers 9a and 9b may be modified by giving the corrugations of the crimped portion 17a a different configuration of pitch, so as to circumscribe in each corrugation located particularly at the sides of the chamber 9b, more than one orifice 10. It is thus possible to direct a flow of air toward the perforated plates 13 which is twice the flow supplied to the chamber 9a.

The ferrule 17 therefore assures a supply of air to the impact holes 15, while conserving the beneficial effect of cooling by means of the impact on the end 12 of the enclosure 9.

The cooling air in the chamber 9b passes through the plates 13 by way of the orifices 15, strikes the wall of the packing ring 5 in a radial direction and escapes from the space 16 through the passages 14 (FIG. 4).

The air striking the end 12 of the chamber 9a is evacuated along a path indicated by the arrow f (FIG. 2). It is thus necessary to leave a space between the downstream part of the generally circular ferrule, extending in a radial plane, and the end 12 of the enclosure 9 (FIGS. 6 and 10). For this purpose, the ferrule has an annular part 17b located in a radial plane, at its downstream end; this annular part may be separate and distinct as in the embodiment of FIGS. 2 and 4, or produced directly by shaping as illustrated by FIG. 6 or 8. A space is provided between said part 17b and the end 12 of the housing, said space permitting the evacuation of the air entering the chamber 9a toward the orifices 24 through the indentations or holes 23 machined into the packing rings.

It is of advantage in certain cases to design the corrugations of the ferrule 17 so that they will play the role of a diffuser for the air entering through the orifices 10 into the chamber 9a, in order to reduce the kinetic energy of the jets upon their impact on the end 12 of the enclosure 9 and thus to assure better homogeneity of cooling.

The ferrule 17 is made of a material with high elongation, particularly thin sheet, capable of deformation, so that said ferrule may be made in the form of a continuous annulus (FIGS. 2 and 3) which is mounted by deforming the same to place it in the enclosure 9 of the housing, prior to the installation of the packing rings 5.

Because of this deforming capability, the ferrule 17 is held in the upstream section of the housing by gripping the same between said housing and the rings 5 of the turbine, with bosses 18 being provided at the apex of the corrugations in contact with the housing.

Downstream, the ferrule 17 is maintained in position by the elements of angles 19 fastened in any suitable manner to the ferrule and kept clamped between the housing 6 and the rings 5 (FIGS. 6 and 7).

The centering and fixation of the ferrule in the enclosure 9 may be attained by means of centering shoulders 20 of the rings (FIGS. 8 and 9). The shoulders are formed by a parallelepipedic part 20a which cooperates with recesses 21 machined in the flange of each ring 5 and a cylindrical part which engages between two elements of the angle 19, 19a mounted on the ferrule, as mentioned hereinabove.

Figure 14:
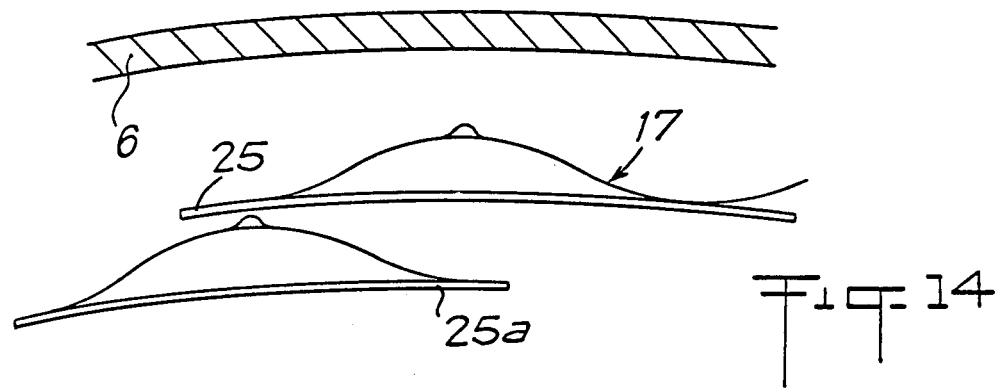
FIG. 14 is an enlarged view of a detail of the embodiment of FIG. 13.
Figure 13:
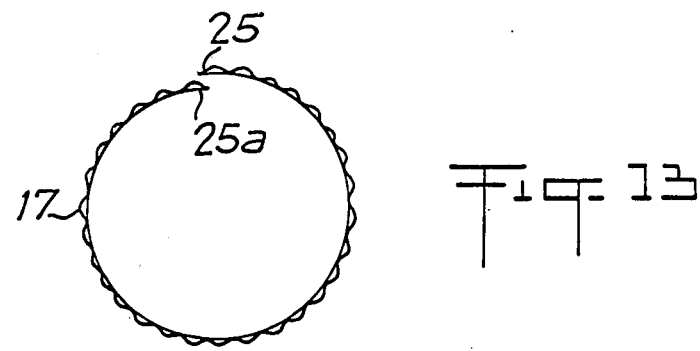
FIG. 13 is a schematic end view of a discontinuous ferrule.

The installation of the ferrule 17 may be simplified in certain cases by cutting it and it is then present in the form of a coiled element or band (FIGS. 13, 14) having two ends 25, 25a, placed edge to edge as in the embodiment of FIG. 15 in order to ensure tightness.

Figure 11:
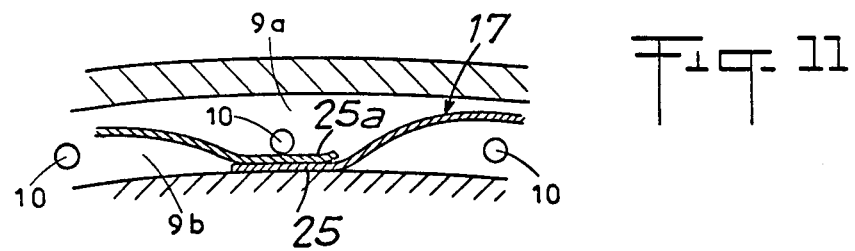
FIG. 11 is a sectional view taken on the line XI—XI of FIG. 10.
Figure 12:
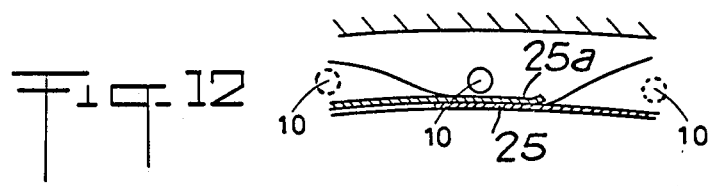
FIG. 12 is a sectional view taken on the line XII—XII of FIG. 10.

According to another embodiment, shown in FIGS. 10, 11 and 12, the two ends 25, 25a of the element or band constituting the ferrule 17, are overlapping so as to assure tightness between the two chambers 9a, 9b. It would also be possible to segment the ferrule 17.

According to still another embodiment, shown by the broken line in FIG. 10, it is also possible, in order to facilitate the installation of the ferrule 17, to divide the housing 6 into two elements, to be assembled by means of additional flanges 26, 26a.

We claim:

1. In a device for the impact cooling of packing rings of the turbine of turbojet engines by relatively cold air issuing from an upstream source and directed by means of orifices in a radial flange of the turbine housing into an enclosure concentric with said rings and defined by the turbine housing and perforated plates separated from the external surface of the rings by a space communicating with the jet of motive fluid, the improvement comprising:
   a generally circular ferrule in said enclosure and dividing the same into two chambers, with one of the chambers being defined by the ferrule and the turbine housing and supplied with cooling air by some of said orifices, and the other chamber being defined by the ferrule and the perforated plates and supplied with cooling air by the other of said orifices.

2. A device according to claim 1 wherein the generally circular ferrule is formed at its upstream part to a crimped configuration with corrugations, with the pitch of said configurations being chosen so that one portion of the corrugations circumscribes the orifices for the admission of cooling air to the chamber defined by the ferrule and the housing, and the other part of the corrugations circumscribes the orifices providing communication with the chamber defined by the ferrule and the perforated plates.

3. A device according to claim 1 wherein the downstream part of the ferrule has a generally circular configuration, located in a radial plane and spaced from the adjacent end of the turbine housing whereby a passage is provided to evacuate cooling air.

4. A device according to claim 1 wherein the upstream part of said ferrule is secured by clamping the same between the turbine housing and the packing rings.

5. A device according to claim 4, wherein bosses are provided on the upstream part of the ferrule, said bosses bearing against the turbine housing.

6. A device according to claim 1 wherein the ferrule is secured at its downstream end by means of angle elements clamped between the housing and the packing rings.

7. A device according to claim 6 wherein centering and fixation of the ferrule against rotation in the enclosure is provided by means of centering shoulders of the rings.

8. A device according to claim 7 wherein said centering shoulders include a parallelepipedic part which engages a recess in a flange of each packing ring and a cylindrical part engaged between two elements of the angle.

9. A device according to claim 2 wherein the corrugations of the crimped part of the ferrule are configured to constitute a diffuser for the cooling air.

10. A device according to claim 2 wherein the crimped ferrule is annularly continuous and of a high elongation material whereby it may be installed by deforming the same.

11. A device according to claim 1 wherein the ferrule consists of a coiled element or band, the ends of said element or band being overlapped.

12. A device according to claim 1 wherein the ferrule consists of a coiled element having its ends placed edge to edge.

13. A device according to claim 1 wherein the turbine housing consists of two parts having facing flanges secured together.

* * * * *